No. 662,097. Patented Nov. 20, 1900.
J. H. SCHNEIDER.
COMPUTING SCALE.
(Application filed Feb. 23, 1899.)
(No Model.)
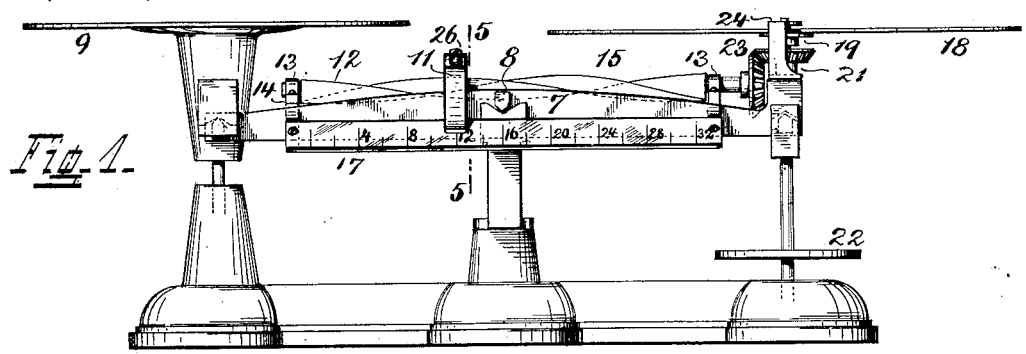
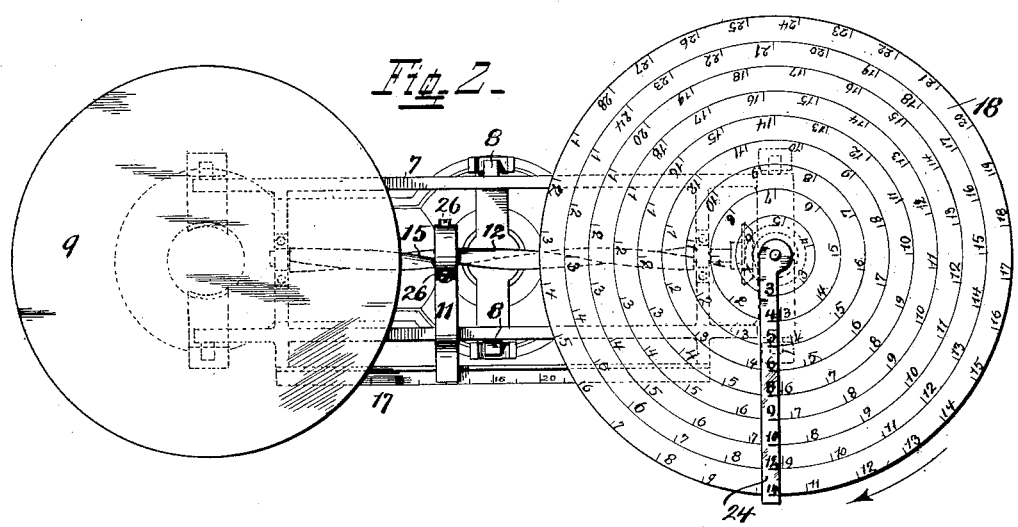
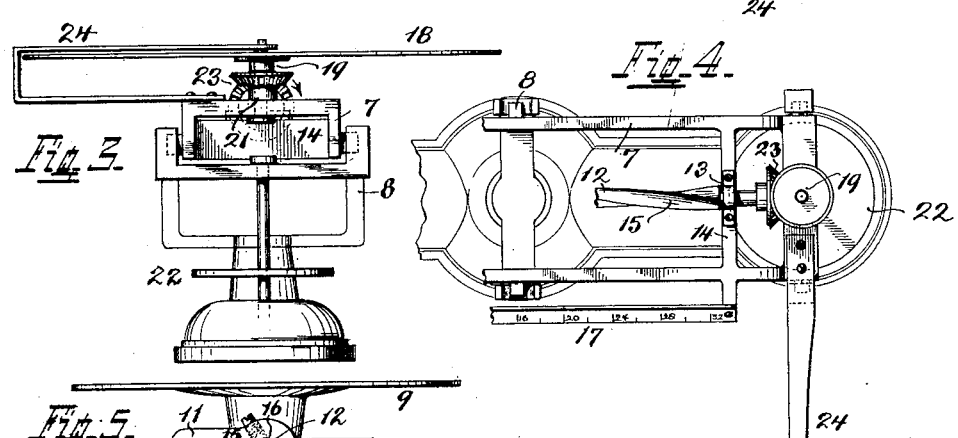
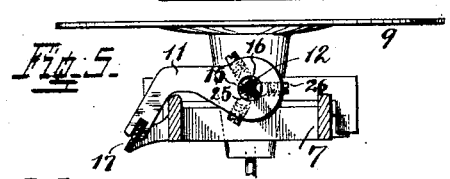
Witnesses
R. B. Goodrich
John C. Rogers
Inventor
John H. Schneider
by C. Spengel Atty.

UNITED STATES PATENT OFFICE.

JOHN H. SCHNEIDER, OF NORWOOD, OHIO.

COMPUTING-SCALE.

SPECIFICATION forming part of Letters Patent No. 662,097, dated November 20, 1900.

Application filed February 23, 1899. Serial No. 706,488. (No model.)

*To all whom it may concern:*

Be it known that I, JOHN H. SCHNEIDER, a citizen of the United States, and a resident of Norwood, Hamilton county, State of Ohio, have invented certain new and useful Improvements in Computing-Scales; and I do hereby declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to improvements in scales provided with a sliding weight or poise and with an attachment showing, with the weight of an apportioned quantity of a certain article, also at once the price of the quantity so weighed.

It relates also more particularly to such scales where these two results are had by obtaining only one of them directly, which may be either one, after which the other appears automatically as a necessary consequence—that is to say, a scale as here outlined weighs either by weight or by money value to suit the particular form in which the demand is made. For instance, if one pound is wanted the poise is set to weigh one pound, the attachment showing at the same time the price of it. If ten cents worth is wanted, the poise is set to weigh ten cents worth, the construction being such that the scale balances only at the correct weight intended to be given, but such weight is not considered, nor does it appear in the transaction. The setting of the scale is done in each case by moving the poise and adjusting its position in conjunction with graduated scales, the one used in the first case showing weights and the one used in the second case showing money values, the two showings being dependent, however, on each other and are always present simultaneously.

My invention consists of the general construction and arrangement shown, and particularly of the construction and means used for indicating the money values.

In the following specification, and particularly pointed out in the claim at the end thereof, is found a full description of the invention, its operation and manner of use, as well as its parts and construction, which latter is also illustrated in the accompanying drawings, in which—

Figure 1 shows in elevation an ordinary counter-scale with my invention applied thereto. Fig. 2 is a top view of the preceding figure. Fig. 3 is an end view of Fig. 1 looking at it from the right. Fig. 4 shows a portion of Fig. 2 with the large disk carried at the right end of the scale-beam removed. Fig. 5 is a cross-section on line 5 5 of Fig. 1.

This invention is applicable to all scales using an adjustable weight in form of a sliding poise. In this case it is shown as applied to a so called "even-balance" scale, meaning thereby a scale having its beam supported midway between its ends. In the drawings, 7 indicates this scale-beam, which is supported at 8. Such scale-beams are usually in form of a frame in order to obtain sufficient width for support of the scale pans or platforms. Only one of the latter is used in this case, (indicated by 9,) which receives the matter to be weighed.

11 is the sliding weight or poise, supported on a rod 12, the ends of which are mounted in bearings 13, resting on cross-pieces 14, which are part of the frame forming the scale-beam. Poise 11 is capable of a sliding adjustment on rod 12, which latter is also free to rotate in its bearings. The two are connected to a certain extent by a projection on one received by a corresponding depression in the other, which engagement has the effect that a sliding movement of the poise causes rotation of the rod. This connection is accomplished in this case by a twist 15 on the rod occupying a correspondingly-formed opening 16 in the poise, said twist being disposed to wind spirally around the rod. In order to obtain such rotation, it is necessary, however, to prevent the poise from rotating with rod 12, for which purpose the former is connected to an additional rod in a manner to permit it to slide thereon, but forming an obstacle to rotation on rod 12. For such purpose I use the graduated scale 17, which indicates weights and is carried by the scale-beam in the usual manner. The connection thereto is in any suitable manner—as, for instance, by a groove cut in the poise, as shown, and occupied by said scale. The place of the other scale-pan, generally used to receive additional weights in case the capacity of the sliding weight or poise is exhausted, is occupied by a rotary disk 18, provided on its under side with a pivot 19 and mounted in a bearing 21, formed in a cross-piece of the frame constituting the scale-beam. A resting-place for any such additional weights in case they are needed is provided by a platform 22, hung to this end of the scale-beam at a proper distance from the fulcrum of the latter and with reference to the other scale-pan 9.

The respective locations of the nearest end of rod 12 and of pivot 19 are such with reference to each other that operative connection between them for the purpose of transmitting the rotary motion of the first to the second is possible. This operative connection is accomplished by a pair of bevel-wheels 23, mounted, respectively, one at the end of rod 12 and the other on pivot 19. It is now clear that any longitudinal movement of poise 11 causes disk 18 to rotate, the extent of which rotation bears a definite relation and is directly proportional to the extent of such movement by reason of the operative connection of the parts.

If disk 18 be provided with graduations, the change in position of any particular graduation is therefore equivalent to the change in position of the poise, as the same is indicated by the graduations on scale 17. As to the disk, this change in position is indicated by a stationary scale 24, attached to the scale-beam, extending outwardly therefrom and then traversing half of the disk. The details of this connection are immaterial as long as scale 24 preserves its position with reference to disk 18. A reversal of the functions of these two elements is also conceivable and readily carried out in this way, so that the disk is maintained stationary and scale 24 caused to rotate about it.

The operation of such a scale may now be readily understood, reference being had to the drawings, and particularly to the position of parts as shown in Fig. 2. If, for instance, twelve ounces of a certain commodity are wanted, the poise is moved to figure "12" on the graduated scale 17, whereby the scale is set to weigh twelve ounces. The movement of poise 11 rotates rod 12 and through it effects rotation of disk 18, which now, in conjunction with graduated scale 24, shows the price of the particular quantity sold. If the price was four cents per pound, disk 18 will show the value of the quantity weighed to be three cents, the figure "3" appearing opposite the figure "4" on scale 24. If the demand is made in money value—for instance, six cents worth is wanted of a certain merchandise costing eight cents per pound—the poise is simply moved until the figure "6" on disk 18 appears opposite the figure "8" on scale 24, when the scale is set to balance a certain weight equivalent in value to six cents worth of the particular merchandise costing eight cents per pound. This would be weighing by money value altogether and is of particular advantage in weighing meats, which cannot always be cut to a certain weight. For instance, ten cents worth of meat is wanted costing twelve cents per pound. A piece supposed to be right is cut off and thrown on platform 9. The poise is now moved until the scale balances, after which the figure on disk 18 next to figure "12" on scale 24 is noted. It is found to be nine cents, showing that only nine cents worth of meat was cut off. When weighing in this manner—that is, by money value—no attention is paid to the particular weight as indicated on scale 17 by the poise, and the latter is then merely used to balance the scale and to obtain by its sliding movement rotation of disk 18.

The weighing capacity of this scale is increased by additional weights placed on platform 22, in correspondence with which the computing capacity may also be increased. This is done by broadening scale 24 and adding additional figures thereon. For instance, if an additional weight of one pound were used on platform 22 the figures in the additional row would be double of those now shown. In computing the value of goods weighed these figures are then simply added to the figure indicated by disk 18.

In order to reduce the friction between poise 11 and twisted rod 12, a ball-bearing is provided by interposing balls 25 between the two. Screws 26 back of these balls serve to obtain a proper adjustment and to take up wear.

Having described my invention, I claim as new—

In an even-balance scale, the combination of a scale-beam supported midway between its ends, a scale-pan carried at one of these latter and a value-indicating disk at the other, a pivot 19 projecting from its under side whereby it is mounted for rotation in such end of the scale-beam, a stationary graduated scale 24 also secured to this end of the scale-beam and extending across the face of the value-indicating disk, a scale 17 and a rod 12, the latter shaped as shown and both supported parallel to the scale-beam and attached near the ends thereof, bearings for rod 12 in which the ends of the same are supported in a manner to be capable of rotation, a poise 11 engaging both scale 17 and rod 12 and supported on them in a manner to be capable of a sliding movement, the engagement between it and rod 12 being such that such sliding movement causes rotation of this rod and a pair of engaging bevel-wheels, one at one end of this latter and the other at pivot 19 whereby rotation of rod 12 causes also the value-indicating disk to rotate, all as shown and for the purpose described.

In testimony whereof I hereunto set my hand in presence of two witnesses.

JOHN H. SCHNEIDER.

Witnesses:
C. SPENGEL,
WM. F. HART.